United States Patent
Song

(10) Patent No.: US 10,236,717 B2
(45) Date of Patent: Mar. 19, 2019

(54) PORTABLE WIRELESS CHARGER AND CRADLE

(71) Applicant: LG INNOTEK CO., LTD., Seoul (KR)

(72) Inventor: Young Kil Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 395 days.

(21) Appl. No.: 15/151,243

(22) Filed: May 10, 2016

(65) Prior Publication Data

US 2016/0359356 A1  Dec. 8, 2016

(30) Foreign Application Priority Data

Jun. 8, 2015 (KR) .................. 10-2015-0080299

(51) Int. Cl.
  *H02J 7/00* (2006.01)
  *H02J 50/00* (2016.01)
  *H02J 50/90* (2016.01)

(52) U.S. Cl.
  CPC ............ *H02J 50/00* (2016.02); *H02J 7/0044* (2013.01); *H02J 50/90* (2016.02)

(58) Field of Classification Search
  CPC ........................................... H02J 7/025
  USPC ......................................... 320/108
  See application file for complete search history.

(56) References Cited

U.S. PATENT DOCUMENTS

| | | | | |
|---|---|---|---|---|
| 2002/0089305 A1* | 7/2002 | Park | ......... | H02J 50/10 320/108 |
| 2009/0096413 A1* | 4/2009 | Partovi | ......... | H01F 5/003 320/108 |
| 2011/0187318 A1* | 8/2011 | Hui | ......... | H02J 7/00 320/108 |
| 2011/0221391 A1* | 9/2011 | Won | ......... | H01M 10/44 320/108 |
| 2013/0278207 A1* | 10/2013 | Yoo | ......... | H02J 7/0052 320/108 |
| 2013/0307468 A1* | 11/2013 | Lee | ......... | H02J 7/0052 320/108 |

FOREIGN PATENT DOCUMENTS

| | | |
|---|---|---|
| CN | 203466598 U | 3/2014 |
| CN | 203788012 U | 8/2014 |
| CN | 204145016 U | 2/2015 |
| KR | 10-2005-0067733 A | 7/2005 |
| KR | 10-2007-0084645 A | 8/2007 |
| KR | 10-2013-0008317 A | 1/2013 |
| KR | 20-2013-0000358 U | 1/2013 |
| KR | 10-1443007 B1 | 9/2014 |

* cited by examiner

*Primary Examiner* — Yalkew Fantu
(74) *Attorney, Agent, or Firm* — Birch, Stewart, Kolasch & Birch, LLP

(57) ABSTRACT

A portable apparatus can be used for a wireless charging operation. The portable apparatus includes a charging body including a transmitter configured to send a power signal for a charging operation, a first rotating member supporting a charging target, and a second rotating member supporting the charging body. Herein, the first rotating member and the second rotating member revolve around the charging body in a predetermined direction, but move within different rotating angles.

19 Claims, 18 Drawing Sheets

180

PORTABLE WIRELESS CHARGER AND CRADLE

CROSS-REFERENCE TO RELATED APPLICATION

This application claims priority to and the benefit of Korean Patent Application No. 10-2015-0080299, filed on Jun. 8, 2015 in the Korean Intellectual Property Office, the disclosure of which is hereby incorporated by reference as if fully set forth herein.

TECHNICAL FIELD

The disclosure relates to a portable wireless charger and cradle, and more particularly, to a portable foldable wireless charger and cradle for enhancing convenience and transportability.

BACKGROUND

As a wireless charging technology becomes widespread, various charging pads have been suggested to supply wireless power signals. The charging pad can be useful to charging a mobile device when there is a flat surface, but it has shortcomings such as a somewhat plane. Further, the mobile device should locate on the same flat surface during charging operation so that it is difficult for a user to use the mobile device during the charging operation. Also, in a particular place such as a showroom, a cradle-type charging device rather than a plane-type one is required for enhancing a demonstration effect. The cradle-type charging device could be convenient to use the mobile device during the charging operation.

The cradle-type charging device can have a transportability problem when its volume becomes large. Thus, a foldable cradle-type charging device has been suggested.

FIGS. 1A to 1C show a conventional cradle-type wireless charging device. Particularly, FIG. 1A describes a front of the cradle-type wireless charging device when all elements thereof are folded, while FIG. 1B shows the reverse side of the cradle-type wireless charging device in the same condition. Further, FIG. 1C shows an unfolded state of the cradle-type wireless charging device.

The cradle-type wireless charging device includes a charging body 12, a cradle support member 14, a target support member 18, and a hinge member 16. While a user moves, the cradle-type wireless charging device can be folded to enhance transportability. When the charging body 12 and the cradle support member 14 are folded, a back side 12B of the charging body 12 can be shown in one side while, in the other side, the cradle support member 14 touches a front side 12A of the charging body 12. The cradle support member 14 can revolve around the charging body 12 through the hinge member 16 configured to connect the charging body 12 with the cradle support member 14.

Herein, the cradle support member 14 can meet, and revolve around, the charging body 12 so as to be handled simply and carried conveniently. However, since the target support member 18 protrudes from the charging body 12, the target support member 18 is designed to be detached from the charging body 12 in order to increase portability. Though the target support member projecting out over the charging body 12 is detachable to avoid bad portability, it can be highly possible that a user loses the target support member 18. If the target support member 18 is lost, availability of the cradle-type wireless charging device decreases because a charging target such as a mobile device cannot be fastened without the target support member 18.

Though a foldable wireless charging device is introduced as above described, it might be highly that some of its elements can be lost if separate for moving it and combined for using it. A probability to lose some of elements in the foldable wireless charging device can be avoided if the foldable wireless charging device can move away and be used without separation and combination of its element.

SUMMARY

In a foldable wireless charging device, both a cradle support member and a target support member are fastened to revolve around a charging body in order to remove a protrusion on the charging body when both the cradle support member and the target support member are folded, and to enhance transportability and to avoid a risk of losing any element because there is no detachable elements therein.

Further, to secure user's convenience and safety, the foldable wireless charging device can fasten the cradle support member and the target support member when they are unfolded for charging operation, and avoid strain of the cradle support member and the target support member, which can be occurred by an unexpected impact or an excessive force.

A portable apparatus for a wireless charging operation can include a charging body including a transmitter configured to send a power signal for a charging operation, a first rotating member supporting a charging target, and a second rotating member supporting the charging body. Herein, the first rotating member and the second rotating member revolve around the charging body in a predetermined direction, but move within different rotating angles.

The portable apparatus can further include a first rotating control unit configured to make the first rotating member and the second rotating member co-rotate until the first rotating member reaches to the maximum of a first rotating angle while the second rotating member touches, or moves away from, the charging body.

The first rotating control unit can include either a first dent formed on the first rotating member and a first protrusion formed on the second rotating member, or a second protrusion formed on the first rotating member and a second dent formed on the second rotating member.

The portable apparatus can further include a first fastening unit configured to fasten the second rotating member with the charging body.

The first fastening unit can include either a third dent formed on the second rotating member and a third protrusion formed on the charging body, or a fourth protrusion formed on the charging body and a fourth dent formed on the second rotating member.

The portable apparatus can further include a hinging member configured to couple each of the charging body, the first rotating member and the second rotating member to each other.

The maximum of a first rotating angle for the first rotating member can range from about 90° to about 140° while the maximum of a second rotating angle for the second rotating member can range from about 270° to about 330°.

The hinging member can include comprises an auxiliary rotor engaged with the first rotating member and the second rotating member so as to make the first rotating member and the second rotating member co-rotate in the predetermined direction.

The auxiliary rotor can include a connection part configured to engage the auxiliary rotor with the first rotating member, a first path guiding part configured to guide a movement of the first rotating member, a second path supporting part configured to guide a movement of the second rotating member, and a first stopping part configured to determine a maximum rotating angle of the first rotating member.

The first path guiding part and the second path supporting part can be an inner side and an outer side of a single ring-type structure.

The first stopping part can include a fifth protrusion formed on the inner side of the ring-type structure.

The charging body can include a first revolving part engaged with the inner side of the ring-type structure in order to move along the first path guiding part and to be stopped by the first stopping part.

The first revolving part formed on the charging body can include a bar-type structure having curved surfaces at both ends.

The auxiliary rotor can further include a first backlashing stopping unit configured to avoid backlashing of the first rotating member, which incurs due to a reaction caused by a movement of the second rotating member when the second rotating member moves beyond the maximum of the first rotating angle and a movement of the first rotating member is stopped by the first stopping part.

The first backlashing stopping unit can include a side protrusion configured to increase a frictional force on a rotating route guided by the first path guiding part in a predetermined area where the connection part is coupled to the first path guiding part.

The second rotating member can include a first hole formed to be engaged with the hinging member, a second hole formed to determine a second rotating angle of the second rotating member, and a second stopping part protruding from an inner surface of the second hole so as to determine a maximum of the second rotating angle.

The second hole can have a larger diameter than the first hole.

The charging body can include a second revolving part configured to move along a route formed between the hinging member and the second hole.

The second revolving part can include a sixth protrusion formed on the charging body.

The second rotating member can further include a second backlashing stopping unit configured to avoid backlashing of the second rotating member, which incurs due to a reaction caused by a movement of the second rotating member when the second rotating member reaches to the maximum of the second rotating angle.

The charging body can include a fastening unit corresponding to the second backlashing stopping unit.

The second backlashing stopping unit can have a groove-type structure while the fastening unit can have a protrusion-type structure.

Before reaching to the second backlashing stopping unit, the fastening unit can touch the second rotating member to thereby increase a frictional force against a movement of the second rotating member in order to inform that the second rotating member has moved up to the maximum of the second rotating angle.

The second rotating member can include a second revolving alert part configured to increase a frictional force against a movement guided by the second hole in order to inform that the second rotating member has moved up to the maximum of the second rotating angle.

The second revolving alert part can have a lower height than the second stopping part.

The portable apparatus can further include at least one of a first strain avoiding part configured to deviate the charging body from the hinging member, when an external force to rotate the second rotating member beyond a predetermined rotating angle is applied, and a second strain avoiding part configured to deviate the charging body from the second rotating member when the external force is applied.

The first strain avoiding part can include a first inclined plane formed on the hinging member.

The charging body can include a first strain part having a bump structure with another inclined plane engaged with the first inclined plane.

The second strain avoiding part can include a second inclined plane formed on the second rotating member.

The charging body can include a second strain part having a bump structure with another inclined plane engaged with the second inclined plane.

The transmitter can include at least one of antenna or coils configured to provide the power signal into the charging target.

The charging body can include at least one of a battery configured to store a first electric energy and a port configured to receive a second electric energy provided externally.

The first rotating member can include a first slip-resistant part formed in a portion touching another structure when the first rotating member is rotated up to a maximum of first rotating angle, in order to avoid a slip of the portable apparatus, and a second slip-resistant part formed in the opposite side of the first slip-resistant part, in order to avoid a slip of the charging target.

The first and second slip-resistant parts can include a bar-shaped material having a higher coefficient of friction than a predetermined value.

The second rotating member can include a hole to be combined with the first rotating member. Further, a portion of an inner surface of the hole and a portion of an outer surface of the first rotating member, which are touched with each other, can be tilted in the predetermined direction.

A portable cradle can include a supporting body supporting an article, a first rotating member supporting the article, a second rotating member supporting the supporting body, and a hinging member configured to couple each of the supporting body, the first rotating member and the second rotating member to each other. Herein, the first rotating member and the second rotating member revolve around the supporting body in a predetermined direction, but move within different rotating angles.

The portable cradle can further include a first rotating control unit configured to make the first rotating member and the second rotating member co-rotate until the first rotating member reaches to the maximum of a first rotating angle while the second rotating member touches, or moves away from, the supporting body.

The first rotating control unit can include either a first dent formed on the first rotating member and a first protrusion formed on the second rotating member, or a second protrusion formed on the first rotating member and a second dent formed on the second rotating member.

The portable can further include a first fastening unit configured to fasten the second rotating member with the supporting body.

The first fastening unit can include either a third dent formed on the second rotating member and a third protrusion formed on the supporting body, or a fourth protrusion formed on the supporting body and a fourth dent formed on the second rotating member.

The maximum of a first rotating angle for the first rotating member can range from about 90° to about 140° while the maximum of a second rotating angle for the second rotating member can range from about 270° to about 330°.

The hinging member can include an auxiliary rotor engaged with the first rotating member and the second rotating member so as to make the first rotating member and the second rotating member co-rotate in the predetermined direction.

The auxiliary rotor can include a connection part configured to engage the auxiliary rotor with the first rotating member, a first path guiding part configured to guide a movement of the first rotating member, a second path supporting part configured to guide a movement of the second rotating member, and a first stopping part configured to determine a maximum rotating angle of the first rotating member.

The first path guiding part and the second path supporting part can be an inner side and an outer side of a single ring-type structure.

The first stopping part can include a fifth protrusion formed on the inner side of the ring-type structure.

The supporting body can include a first revolving part engaged with the inner side of the ring-type structure in order to move along the first path guiding part and to be stopped by the first stopping part.

The first revolving part formed on the supporting body can include a bar-type structure having curved surfaces at both ends.

The auxiliary rotor can further include a first backlashing stopping unit configured to avoid backlashing of the first rotating member, which incurs due to a reaction caused by a movement of the second rotating member when the second rotating member moves beyond the maximum of the first rotating angle and a movement of the first rotating member is stopped by the first stopping part.

The first backlashing stopping unit can include a side protrusion configured to increase a frictional force on a rotating route guided by the first path guiding part in a predetermined area where the connection part is coupled to the first path guiding part.

The second rotating member can include a first hole formed to be engaged with the hinging member, a second hole formed to determine a second rotating angle of the second rotating member, and a second stopping part protruding from an inner surface of the second hole so as to determine a maximum of the second rotating angle.

The second hole can have a larger diameter than the first hole.

The supporting body can include a second revolving part to move along a route formed between the hinging member and the second hole.

The second revolving part can include a sixth protrusion formed on the supporting body.

The second rotating member can further include a second backlashing stopping unit configured to avoid backlashing of the second rotating member, which incurs due to a reaction caused by a movement of the second rotating member when the second rotating member reaches to the maximum of the second rotating angle.

The supporting body can include a fastening unit corresponding to the second backlashing stopping unit.

The second backlashing stopping unit can have a groove-type structure while the fastening unit can have a protrusion-type structure.

Before reaching to the second backlashing stopping unit, the fastening unit can touch the second rotating member to thereby increase a frictional force against a movement of the second rotating member in order to inform that the second rotating member has moved up to the maximum of the second rotating angle.

The second rotating member can include a second revolving alert part configured to increase a frictional force against a movement guided by the second hole in order to inform that the second rotating member has moved up to the maximum of the second rotating angle.

The second revolving alert part can have a lower height than the second stopping part.

The portable cradle can further include at least one of a first strain avoiding part configured to deviate the supporting body from the hinging member when an external force to rotate the second rotating member beyond a predetermined rotating angle is applied, and a second strain avoiding part configured to deviate the supporting body from the second rotating member when the external force is applied.

The first strain avoiding part can include a first inclined plane formed on the hinging member.

The supporting body can include a first strain part having a bump structure with another inclined plane engaged with the first inclined plane.

The second strain avoiding part can include a second inclined plane formed on the second rotating member.

The supporting body can include a second strain part having a bump structure with another inclined plane engaged with the second inclined plane.

The first rotating member can include a first slip-resistant part formed in a portion touching another structure when the first rotating member is rotated up to a maximum of first rotating angle, in order to avoid a slip of the portable apparatus, and a second slip-resistant part formed in the opposite side of the first slip-resistant part, in order to avoid a slip of the article.

The first and second slip-resistant parts can include a bar-shaped material having a higher coefficient of friction than a predetermined value.

The second rotating member can include a hole to be combined with the first rotating member. A portion of an inner surface of the hole and a portion of an outer surface of the first rotating member, which are touched with each other, can be tilted in the predetermined direction.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1A:
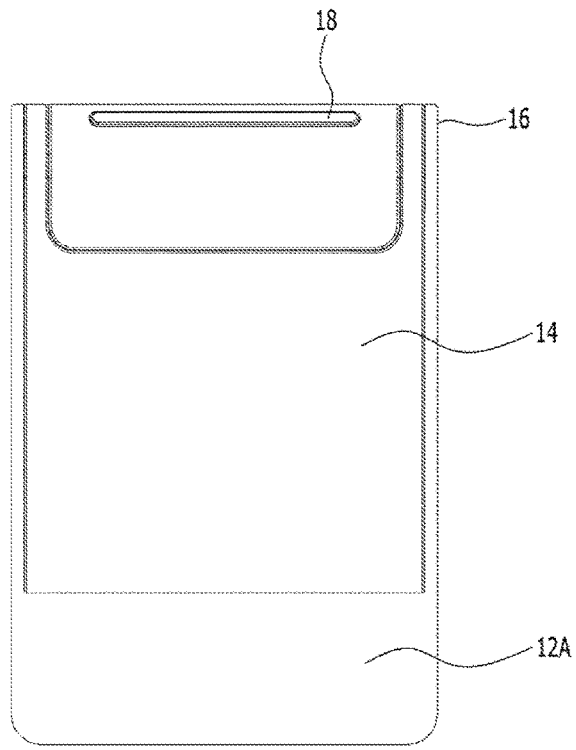
FIGS. 1A to 1C show a conventional cradle-type wireless charging device.
Figure 1B:
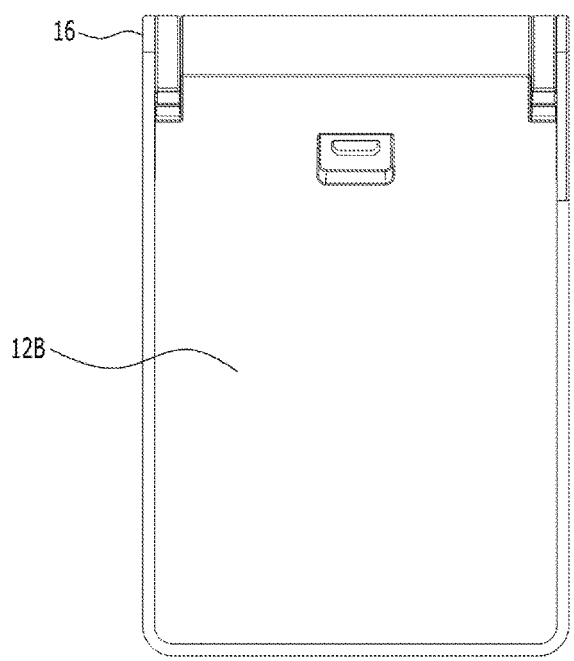
Figure 1C:
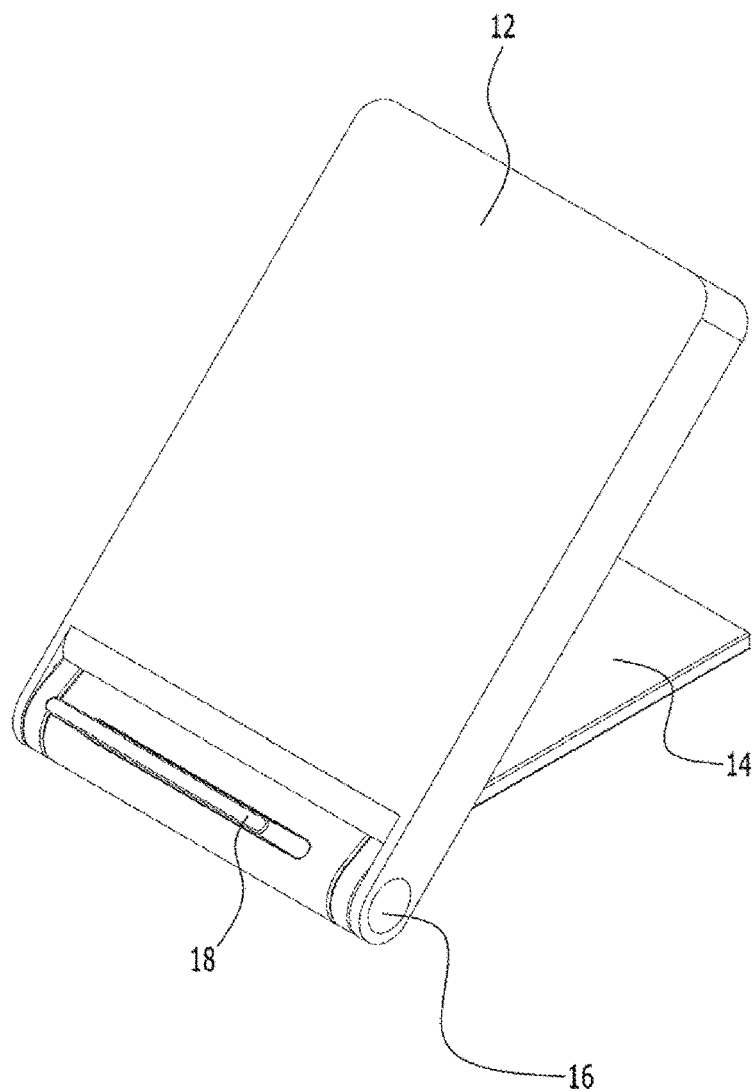

Reference will now be made in detail to the preferred embodiments of the invention, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the description of the invention, certain detailed explanations of related art are omitted when it is deemed that they may unnecessarily obscure the essence of the invention. The features of the invention will be more clearly understood from the accompanying drawings and should not be limited by the accompanying drawings. It is to be appreciated that all changes, equivalents, and substitutes that do not depart from the spirit and technical scope of the invention are encompassed in the invention.

Figure 2A:
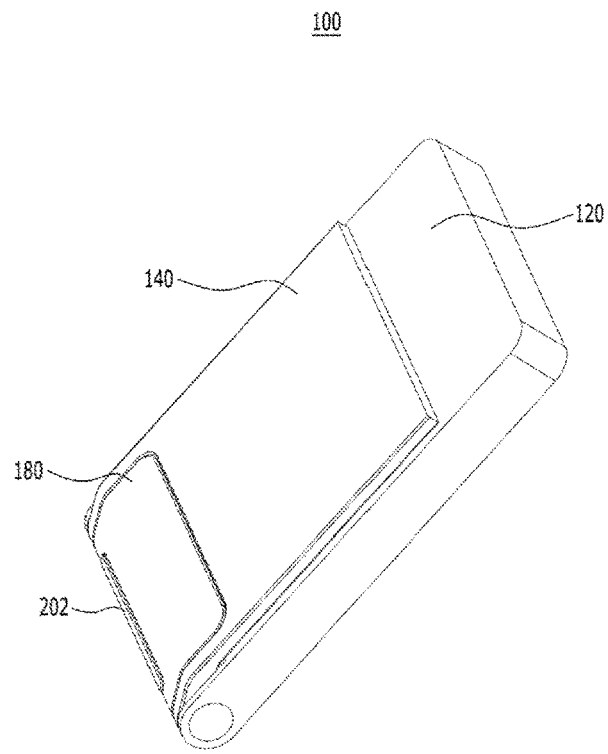
FIGS. 2A to 2C show a portable wireless charging device.
Figure 2B:
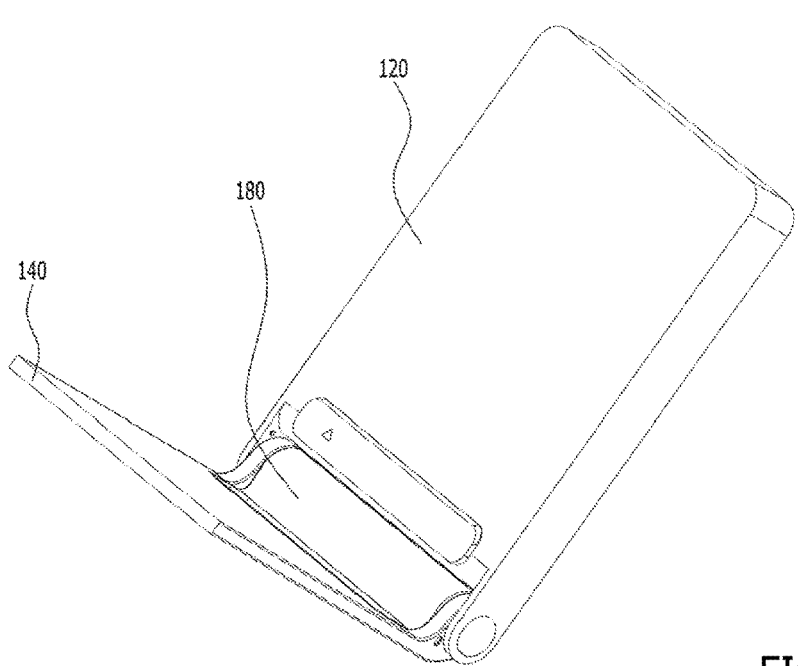
Figure 2C:
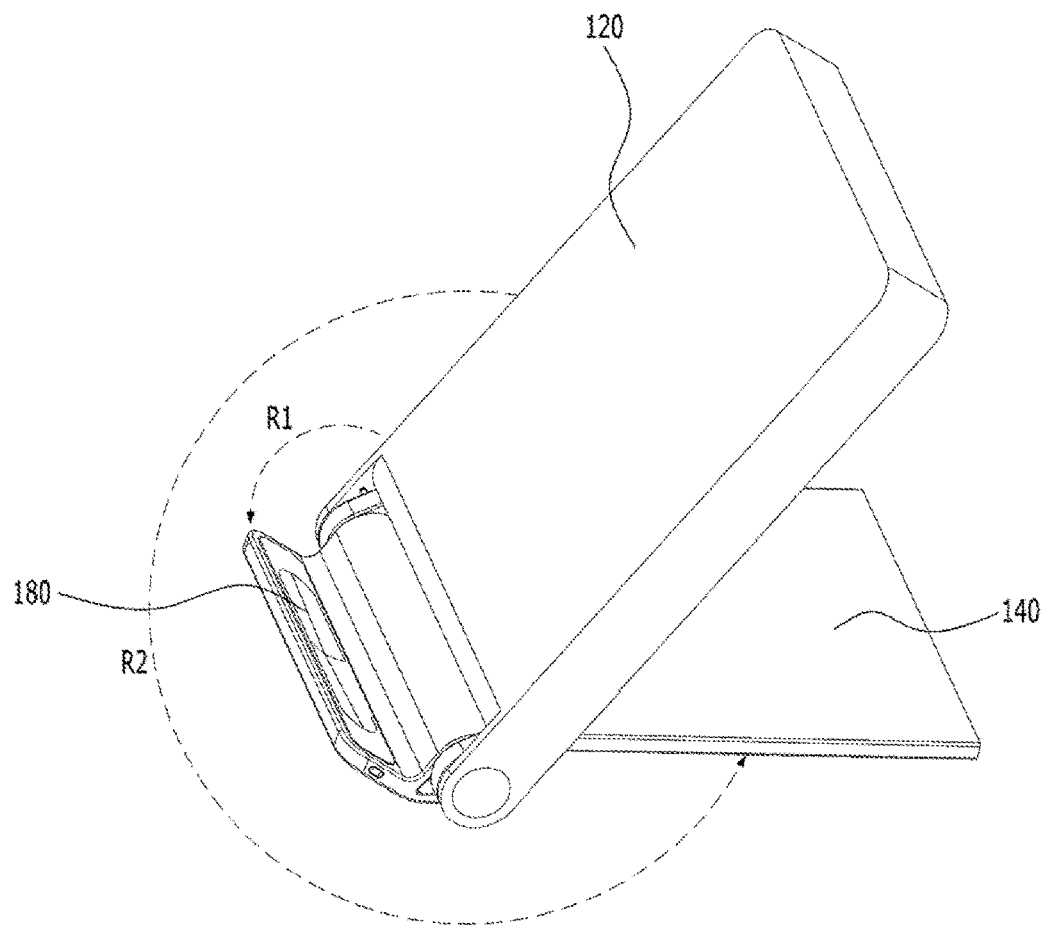

FIGS. 2A to 2C show a portable wireless charging device. FIG. 2A describes the portable wireless charging device when all elements thereof are folded, while FIG. 2B shows the portable wireless charging device when some elements thereof are rotated. Further, FIG. 2C describes an unfolded state of the portable wireless charging device for performing a charging operation after a charging target is sited on the portable wireless charging device.

Referring to FIG. 2A, the portable wireless charging device 100 can include a charging body 120 including a transmitter configured to send a power signal for a charging operation, a first rotating member 180 supporting a charging target, and a second rotating member 140 supporting the charging body 120.

Referring to FIG. 2B, the first rotating member 180 and the second rotating member 140 can be rotated together in a partial section.

Referring to FIG. 2C, both the first rotating member 180 and the second rotating member 140 can revolve around the charging body 120 in a predetermined direction, but move within different rotating angles R1, R2.

Herein, the charging body 120 can include at least one of antenna or coil configured to provide or generate the power signal into the charging target. Further, the charging body 120 can include at least one of a battery configured to store a first electric energy and a port configured to receive a second electric energy provided externally. Particularly, the charging body 120 can include a wireless transmitter for performing a charging operation based on inductive and/or resonance wireless charging technologies. When the charging target siting on the charging body 120 includes a wireless receiver corresponding to the wireless transmitter of the charging body 120, the portable wireless charging device 100 can wirelessly send a power to the charging target. By the way of example but not limitation, the portable wireless charging device 100 can support charging techniques defined by the Wireless Power Consortium (WPC), the Power Matters Alliance (PMA), or the Alliance for Wireless Power (A4WP).

Figure 3:
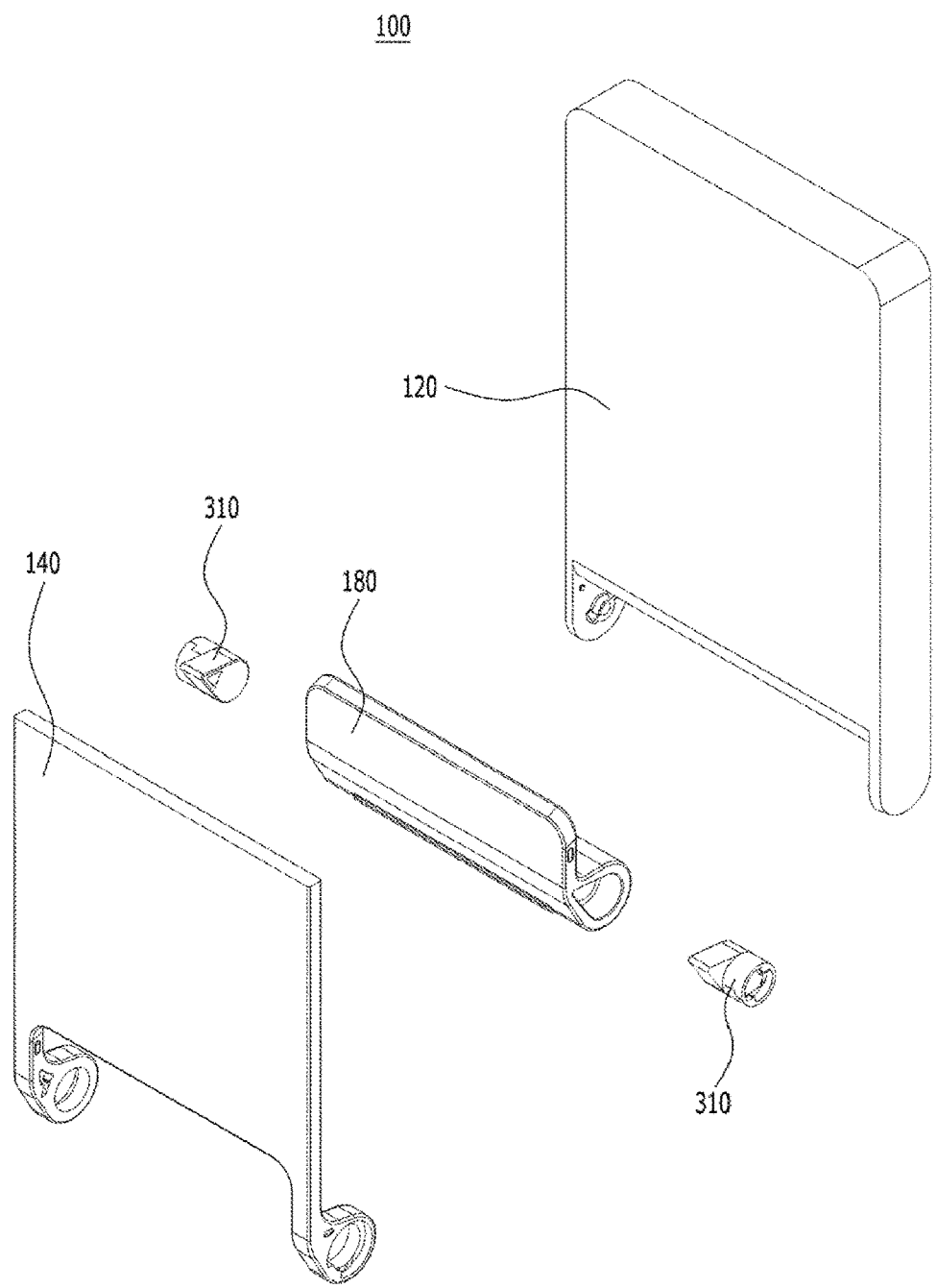
FIG. 3 shows a structure of the portable wireless charging device.

FIG. 3 shows a structure of the portable wireless charging device 100.

The portable wireless charging device 100 can the charging body 120, the first rotating member 180, the second rotating member 140, and a hinging unit configured to couple the first rotating member 180 with the second rotating member 140. Herein, the hinging unit can function as an axis of rotation, in order that both the first rotating member 180 and the second rotating member 140 would revolve around the charging body 120 in one direction.

Referring to FIG. 3, the hinging unit can include an auxiliary rotor 310 configured to make the first rotating member 180 and the second rotating member 140 co-rotate in the predetermined direction. The auxiliary rotor 310 can be located in empty spaces where the charging body 120, the first rotating member 180 and the second rotating member 140 are engaged with each other.

Figure 4:
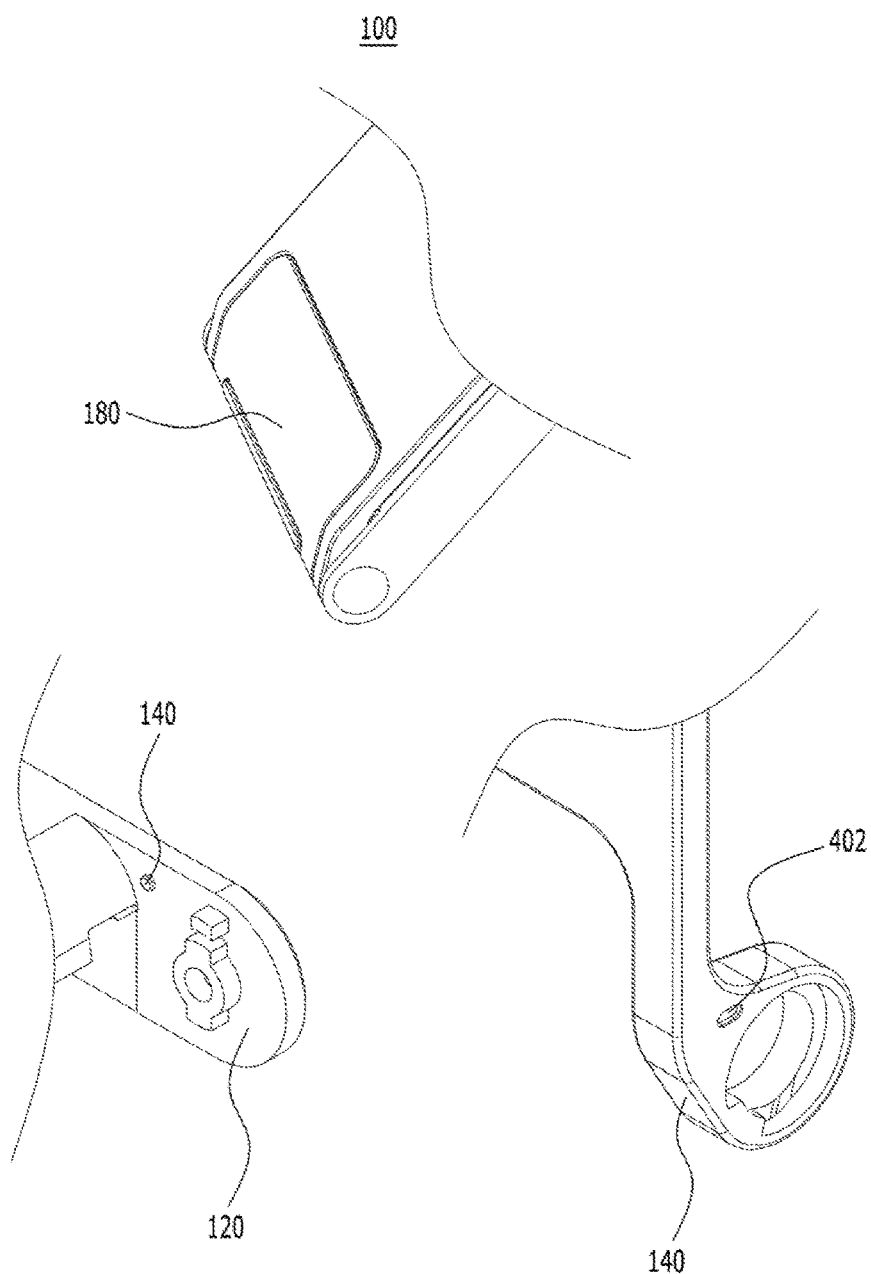
FIG. 4 describes a particular state of the portable wireless charging device when all its elements are folded.

FIG. 4 describes a particular state of the portable wireless charging device 100 when all its elements are folded.

As shown, in the portable wireless charging device 100, both the first rotating member 180 and the second rotating member 140 can be fastened on the charging body 120 in order to increase transportability and/or portability. To fasten the second rotating member 140 on the charging body 120, a fastening unit could be required in an area where the second rotating member 140 can touch the charging body 120. By the way of example but not limitation, the fastening unit can include a first dent 402 formed on the second rotating member 140 and a first protrusion 404 formed on the charging body 120.

Further, as another embodiment, the fastening unit, such as a combination of nut and bolt in the area where the second rotating member 140 can touch the charging body 120, can include a protrusion formed on the charging body 120 and a dent formed on the second rotating member 140.

Figure 5:
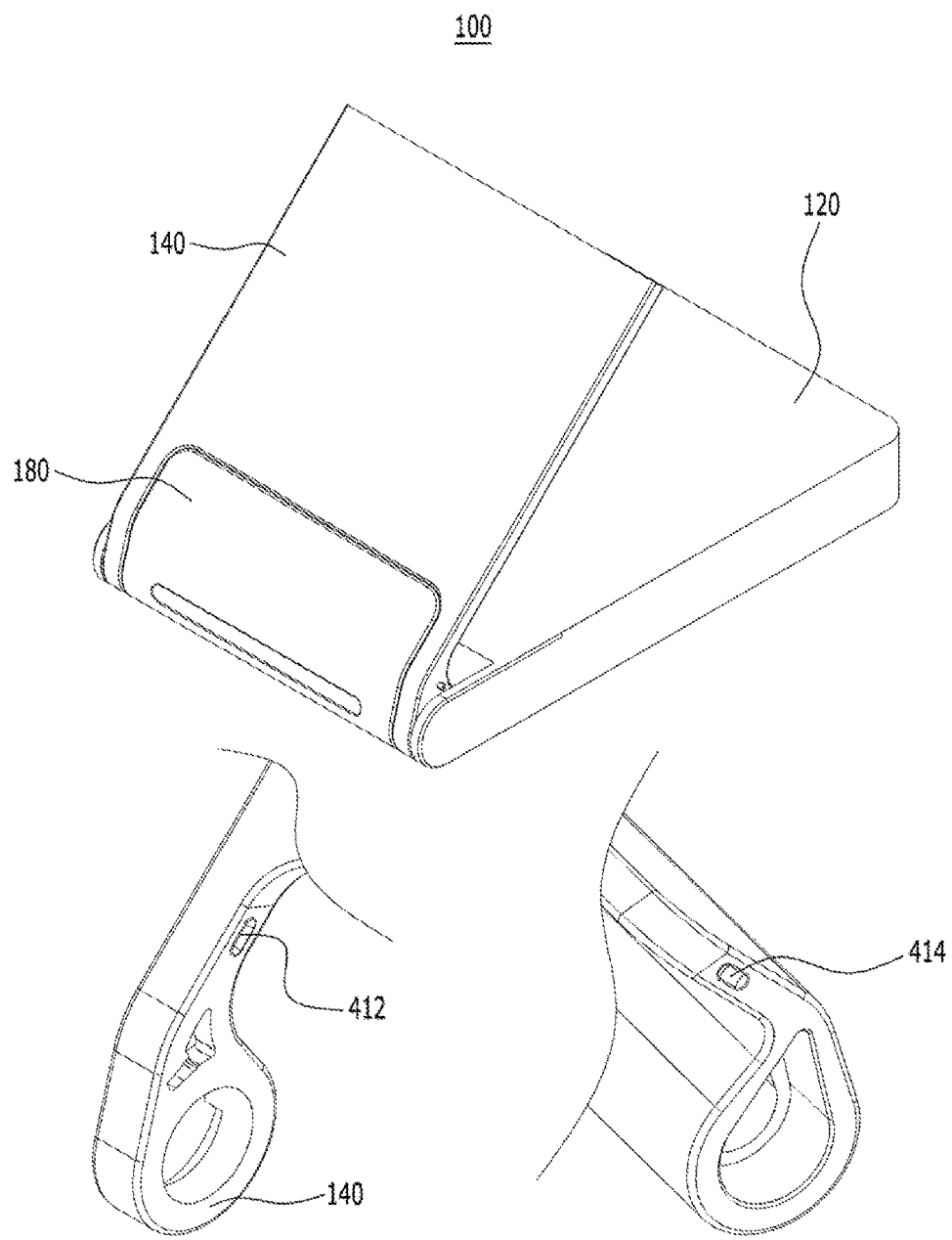
FIG. 5 describes another particular state of the portable wireless charging device when first and second rotating members move.

FIG. 5 describes another particular state of the portable wireless charging device 100 when first and second rotating members 180, 140 move.

Referring to FIGS. 2B and 5, the first rotating member 180 can be rotated with the second rotating member 140 in a partial section. Further, referring to FIG. 4, the first rotating member 180 as well as the second rotating member 140 can be fastened on the charging body 120 if no external force to rotate them is applied when all elements of the portable wireless charging device 100 are folded. In order to achieve above described movements of the first and second rotating members 180, 140, the portable wireless charging device 100 can include a first rotating control unit 412, 414.

For the way of example but not limitation, the first rotating control unit 412, 414 can include a second dent 414 formed on the first rotating member 180 and a second protrusion 414 formed on the second rotating member 140. While the second rotating member 140 touches, or moves away from, the charging body 120, the first rotating control unit can make both the first rotating member 180 and the second rotating member 140 co-rotate until the first rotating member 180 reaches to the maximum of a first rotating angle.

Further, in another embodiment, the first rotating control unit can include a third protrusion formed on the first rotating member 180 and a third dent formed on the second rotating member 140.

Figure 6:
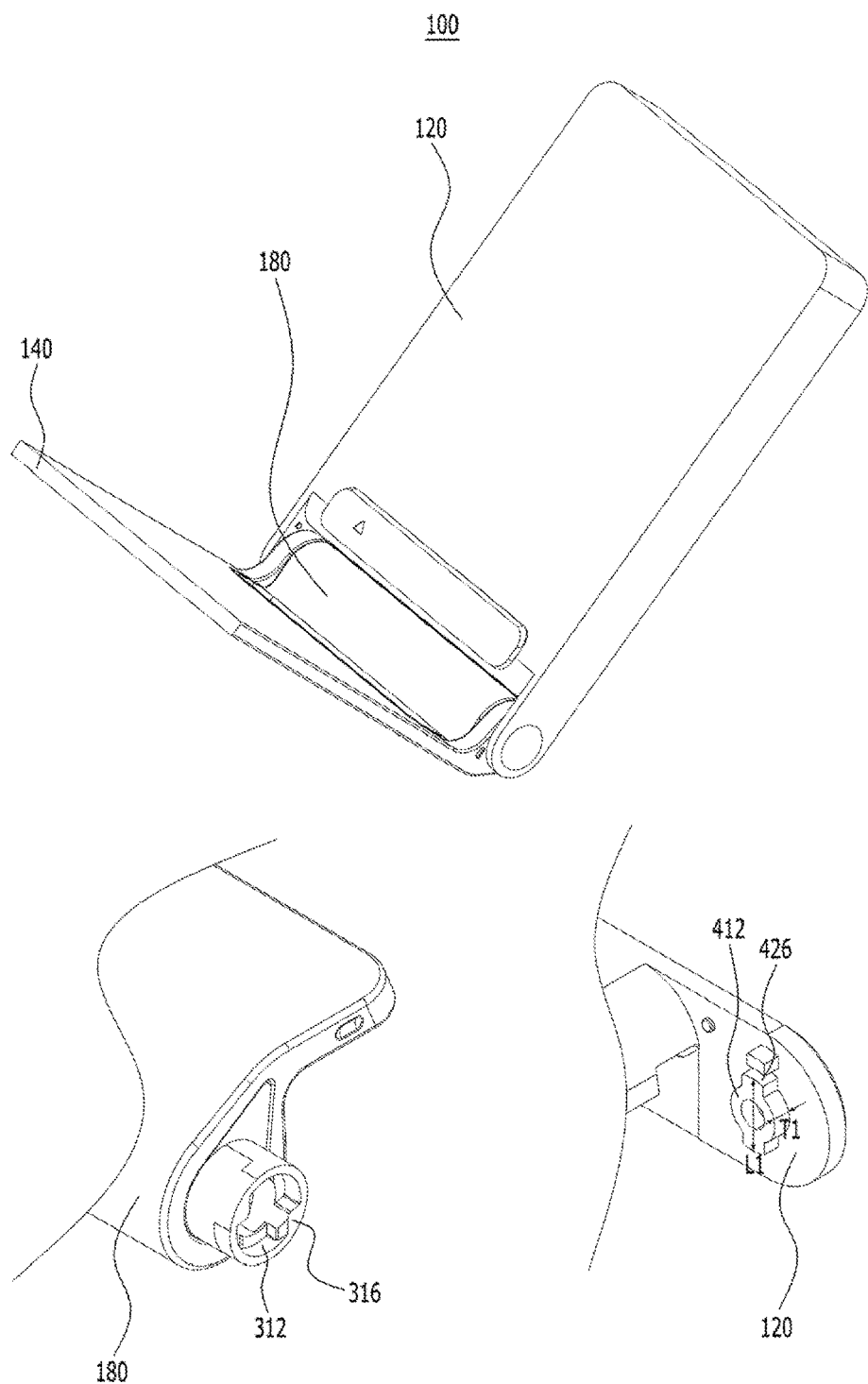
FIG. 6 describes another particular state of the portable wireless charging device when the first rotating member reaches to the maximum of a first rotating angle.

FIG. 6 describes another particular state of the portable wireless charging device 100 when the first rotating member 180 reaches to the maximum of a first rotating angle.

As shown, if the first rotating member 180 moves up to the maximum of a first rotating angle, the first rotating member 180 can be stopped even though the second rotating member 140 is rotated further. Engaged with the first rotating member 180, the auxiliary rotor 310 can include a first path guiding part 312 configured to guide a movement of the first rotating member 180 and a first stopping part 316 configured to determine a maximum rotating angle of the first rotating member 180. Further, the charging body 120 can include a first revolving part 424 which moves along the first path guiding part 312 and is stopped by the first stopping part 316.

The first revolving part 424 projecting out over the charging body 120 can have a bar-type structure including curved surfaces 426 at both ends. A thickness T1 and a length L1 of the first revolving part 424 protruding from the charging body 120 can be changed according to a design. In FIG. 6, the first revolving part 424 is formed in a bar-shaped structure of which center is a wider than both ends. However, the first revolving part 424 can have different shapes according to embodiments.

Figure 7:
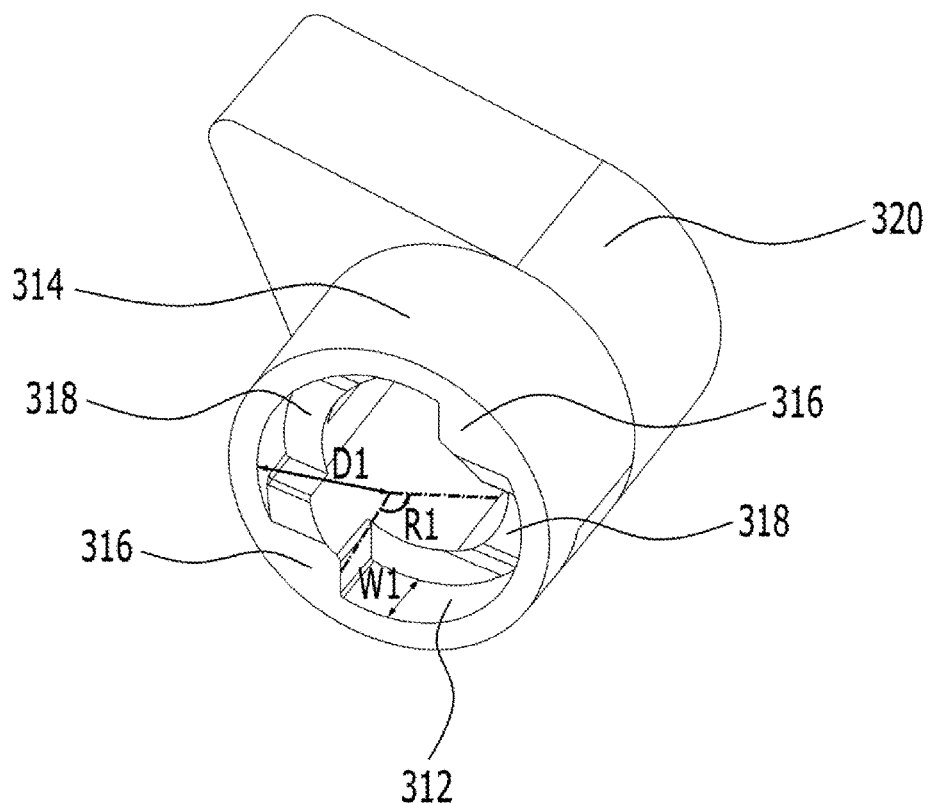
FIG. 7 describes a structure of an auxiliary rotor included in the portable wireless charging device.

FIG. 7 describes a structure of the auxiliary rotor 310 included in the portable wireless charging device 100.

As shown, the auxiliary rotor 310 can include a connection part 310 configured to engage the auxiliary rotor 310 with the first rotating member 180, the first path guiding part 312 configured to guide a movement of the first rotating member 180, a second path supporting part 314 configured to guide a movement of the second rotating member 140, and the first stopping part 316 configured to determine a maximum rotating angle of the first rotating member 180. Herein, the first path guiding part 312 and the second path supporting part 314 can be formed in an inner side and an outer side of a single ring-type structure, respectively. The first stopping part 316 can include a fourth protrusion formed on the first path guiding part 312, i.e., on the inner side of the ring-type structure.

Referring to FIGS. 6 and 7, the first revolving part 424 attached to the charging body 120 can be sited on the first path guiding part 312 formed in the inner side of the ring-type structure. On the inner side of the ring-type structure, the first path guiding part 312 can be split into two portions by the first stopping part 316. The curved surfaces 426 at both ends of the first revolving part 424 can be located at each of the two portions. The curved surfaces 426 can touch, and move on, the first path guiding part 312.

Herein, a width W1 of the first path guiding part 312 should be larger than the thickness T1 of the first revolving part 424 formed on the charging body 120. Further, the length L1 of the first revolving part 424 cannot be twice larger than a radius D1 of the first path guiding part 312, i.e., the inner side of the ring-type structure.

When an angle between the charging body 120 and the first rotating member 180 moving up to the maximum of the first rotating angle R1 is about 90°, the charging target can stably site on the charging body 120. For the way of example but not limitation, in order to support the charging target, the maximum of the first rotating angle R1 can be ranged from 90° to 140° based on a movable range of the first rotating member 180, which is determined on the first path guiding part 312. Further, the maximum of the first rotating angle R1 can be changed or adjusted by a shape of the first rotating member 180.

Further, the auxiliary rotor 310 can include a first backlashing stopping unit 318 configured to avoid backlashing of the first rotating member 180, which incurs due to a reaction caused by a movement of the second rotating member 140 when the second rotating member 140 moves beyond the maximum of the first rotating angle R1 and a movement of the first rotating member 180 is stopped by the first stopping part 316. In order to increase a frictional force on a rotating route guided by the first path guiding part 318, the first backlashing stopping unit 318 can be formed as a protrusion on a side of a predetermined area where the connection part 320 is coupled to the first path guiding part 312. The width W1 of the first path guiding part 312 is narrowed by the first backlashing stopping unit 318 so that a frictional force increases. If the first revolving part 424 is located at a predetermined area adjacent to the first stopping part 316, the backlashing of the first rotating member 180 due to the reaction can be avoided.

Figure 8:
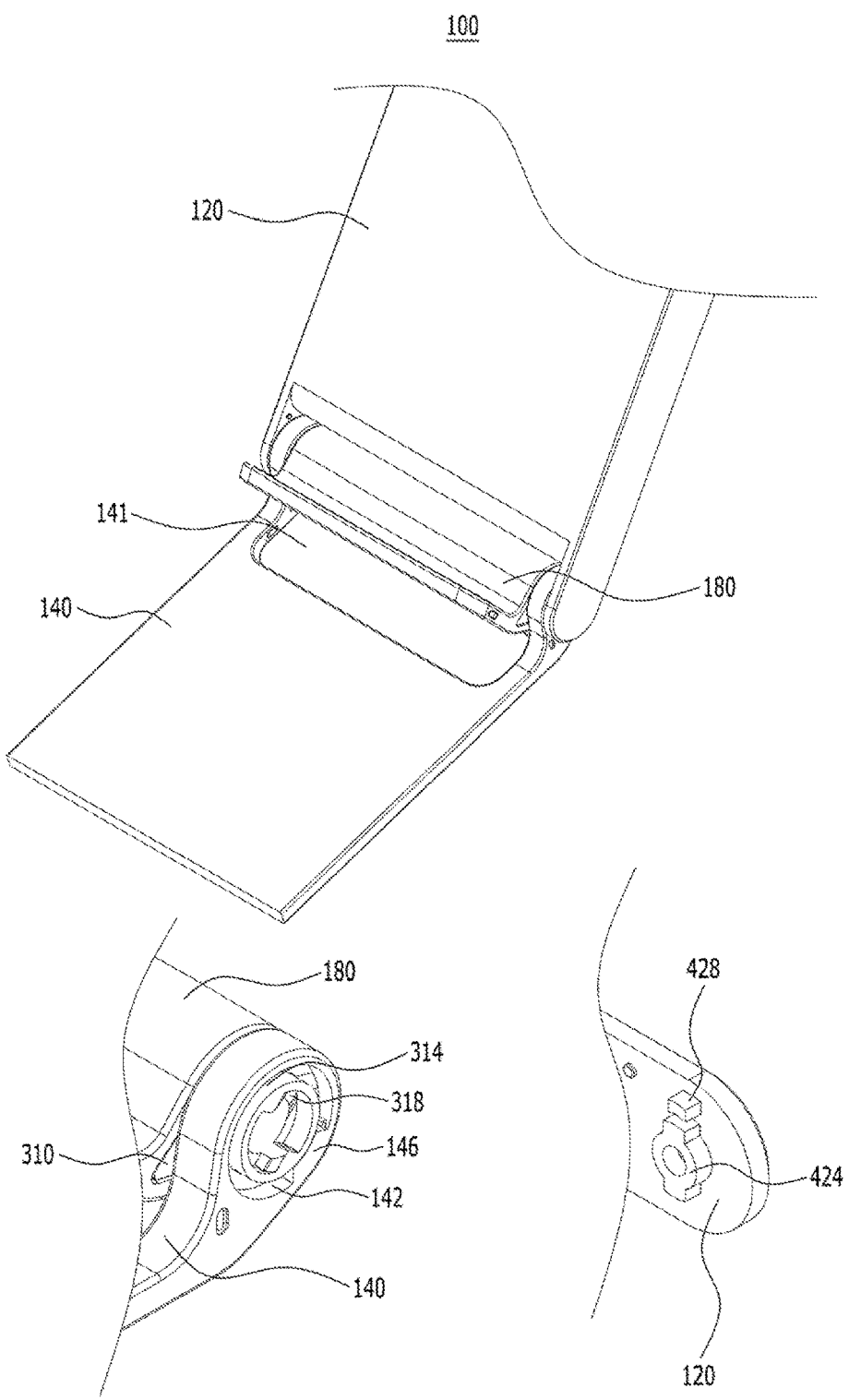
FIG. 8 describes a movement of the second rotating member included in the portable wireless charging device.

FIG. 8 describes a movement of the second rotating member 140 included in the portable wireless charging device 100.

As shown, even though the first rotating member 180 is fastened after revolving around the charging body 120 up to the maximum of the first rotating angle R1, the second rotating member 140 can move further. If the first rotating member 180 is rotated up to the maximum of the first rotating angle R1, the first rotating member 180 can be fastened by the first backlashing stopping unit 318. When the first rotating member 180 is fastened and moves away from an opening 141 of the second rotating member 140, the second rotating member 140 can revolve around the charging body 120 additionally.

The second rotating member 140 can include a second path guiding unit 142 configured to determine a rotating route for the second rotating member 140 and a second stopping part 146 configured to determine the maximum of the second rotating angle R2, shown in FIG. 2C, for the second rotating member 140. The first and second rotating members 180, 140 are engaged with each other by inserting the second path supporting part 314 (i.e., the outer side of the ring-type structure) of the auxiliary rotor 310, coupled to the first rotating member 180, into a hole formed in the second rotating member 140.

The charging body 120 can include a second revolving part 428 configured to move along a route provided by the second path guiding unit 142. The second revolving part 428 can include a fifth protrusion formed on the charging body 120. The second revolving part 428 can move in a space formed between the second path supporting part 314 and the second path guiding unit 142, and be stopped by the second stopping part 146.

Figure 9:
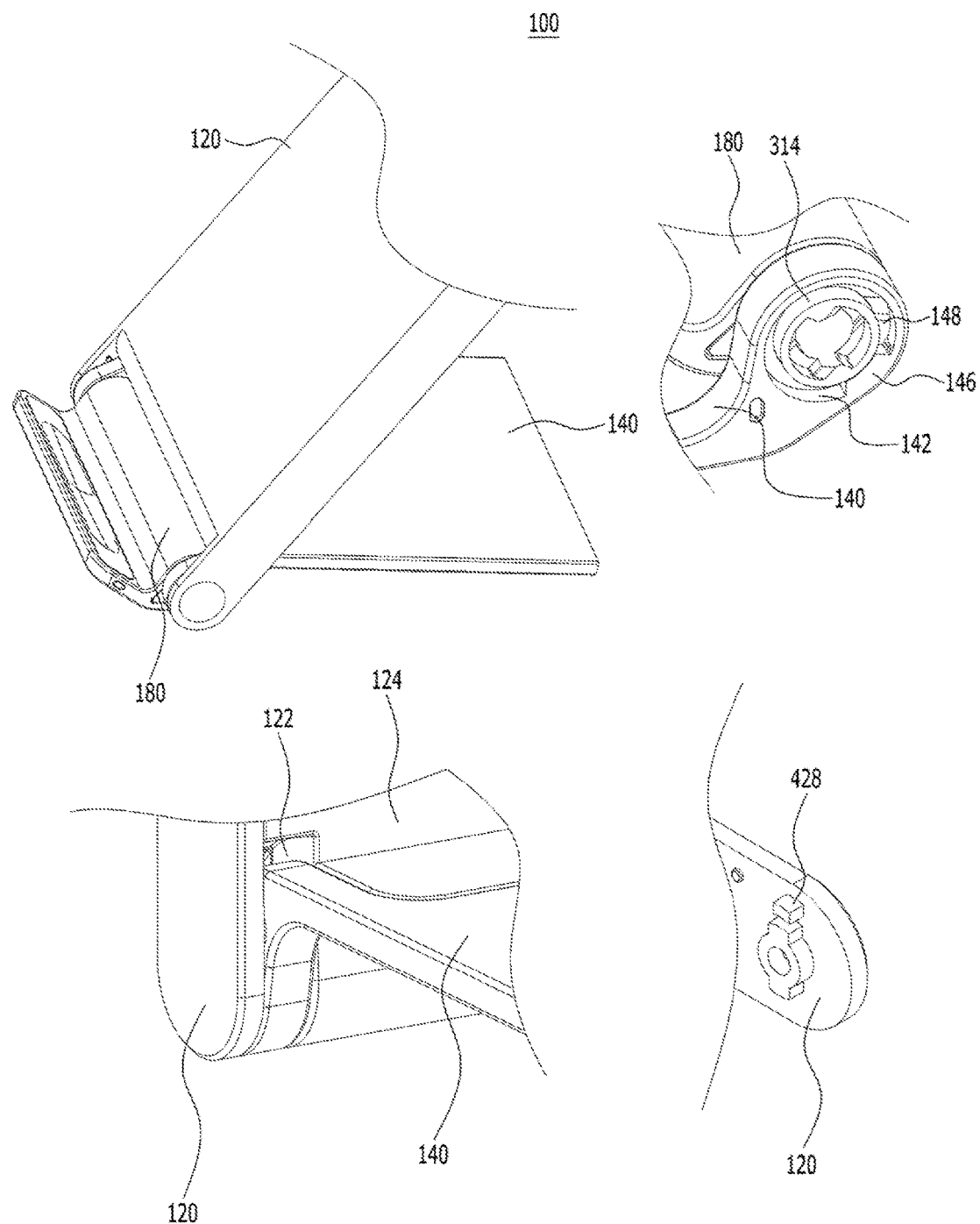
FIG. 9 describes another particular state of the portable wireless charging device when the second rotating member reaches to the maximum of a second rotating angle.

FIG. 9 describes another particular state of the portable wireless charging device 100 when the second rotating member 140 reaches to the maximum of a second rotating angle.

As shown, when reaching up to the maximum of the second rotating angle, the second rotating member 140 of the portable wireless charging device 100 can be fastened. Specifically, when the second revolving part 428 touches the second stopping part 146 while moving in the space between the second path supporting part 314 and the second path guiding unit 142, the second rotating member 140 reaches to the maximum of the second rotating angle and then is fastened.

In an area where the second rotating member 140 is engaged with a reverse side 124 of the charging body 120, a combination groove 122 can be included. When the second rotating member 140 supports the charging body 120 after reaching to the maximum of the second rotating angle, inner surfaces of the combination groove 122 is inclined to touch an outer surface of the second rotating member 140. In the combination groove 122, the second rotating member 140 can touch the charging body 120 so that a load can be uniformly distributed. Further, the combination groove 122 with the second stopping part 146 can determine the maximum of the second rotating angle for the second rotating member 140.

For the way of example but not limitation, the second rotating member 140 can further include a second rotating alert unit 148 configured to increase a frictional force on the route of the second rotating member 140 in the space between the second path supporting part 314 and the second path guiding unit 142, so as to inform that the second rotating member 140 has moved up to the maximum of the second rotating angle. In order to slow movement of the second rotating member 140 due to increased frictional force, the second rotating alert unit 148 can include a protrusion-type structure projecting out over a side in the space between the second path supporting part 314 and the second path guiding unit 142. Herein, a protrusion part of the second rotating alert unit 148 can have a lower height than that of the second stopping part 146.

Figure 10:
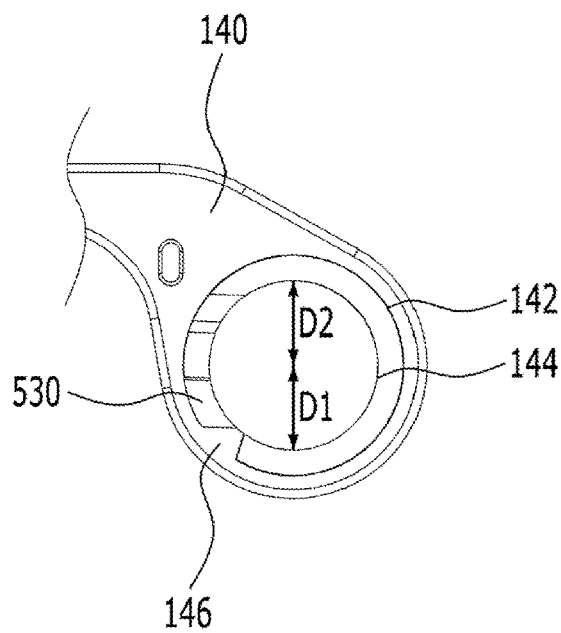
FIG. 10 describes a structure of the second rotating member included in the portable wireless charging device.
Figure 10:
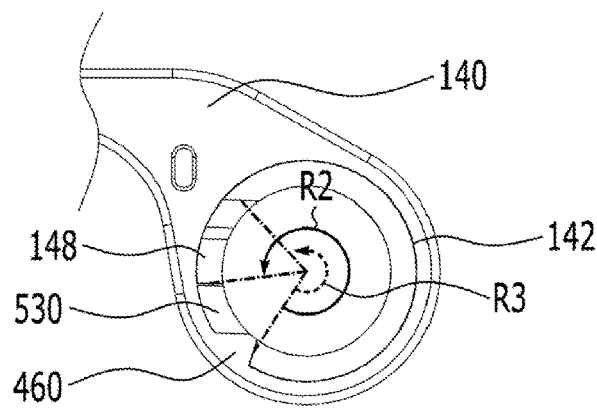

FIG. 10 describes a structure of the second rotating member 140 included in the portable wireless charging device 100.

As shown, the second rotating member 140 can include two hollow spaces which are distinguishable from each other because of their different diameters. The second rotating member 140 can include a first hole 144 formed to be engaged with the auxiliary rotor 310 and a second hole (i.e., the second path guiding unit 142) configured to determine a second rotating angle of the second rotating member 140. Herein, a radius D2 of the first hole 144 is bigger than a radius D3 of the second hole 142.

Further, the second rotating member 140 can further include the second stopping part 146 protruding from an inner surface of the second hole (referred as to the second path guiding unit 142), so as to determine a maximum of the second rotating angle and to stop over-run of the second rotating member 140, and a second strain avoiding part 530 configured to deviate the second rotating member 140 from the charging body 120 when an external force to rotate the second rotating member 140 beyond a predetermined rotating angle is applied.

The maximum of the second rotating angle R2 for the second rotating member 140 can be determined in a range of route along the second path guiding unit 142 from the second stopping part 146 to the second strain avoiding part 530. Though adjusted according to the structure of the second rotating member 140, the maximum of the second rotating angle R2 can ranges from 270° to 330°. Further, the second rotating member 140 can move along the second path guiding unit 142 from the second stopping part 146 until the second rotating alert unit 148 without particular obstacles. An unconstrained rotating angle R3 for the second rotating member 140 can be ranged from 220° to 270°. Though the second rotating member 140 can be rotated up to the unconstrained rotating angle R3 without resistance, a user can feel some resistance when the second rotating member 140 moves beyond the unconstrained rotating angle R3, and understand that the second rotating member 140 almost reaches to the maximum of the second rotating angle R2. Herein, the maximum of the second rotating angle R2 and the unconstrained rotating angle R3 can be adjusted in response to structures or shapes of the second rotating member 140 and the charging body 120.

Figure 11:
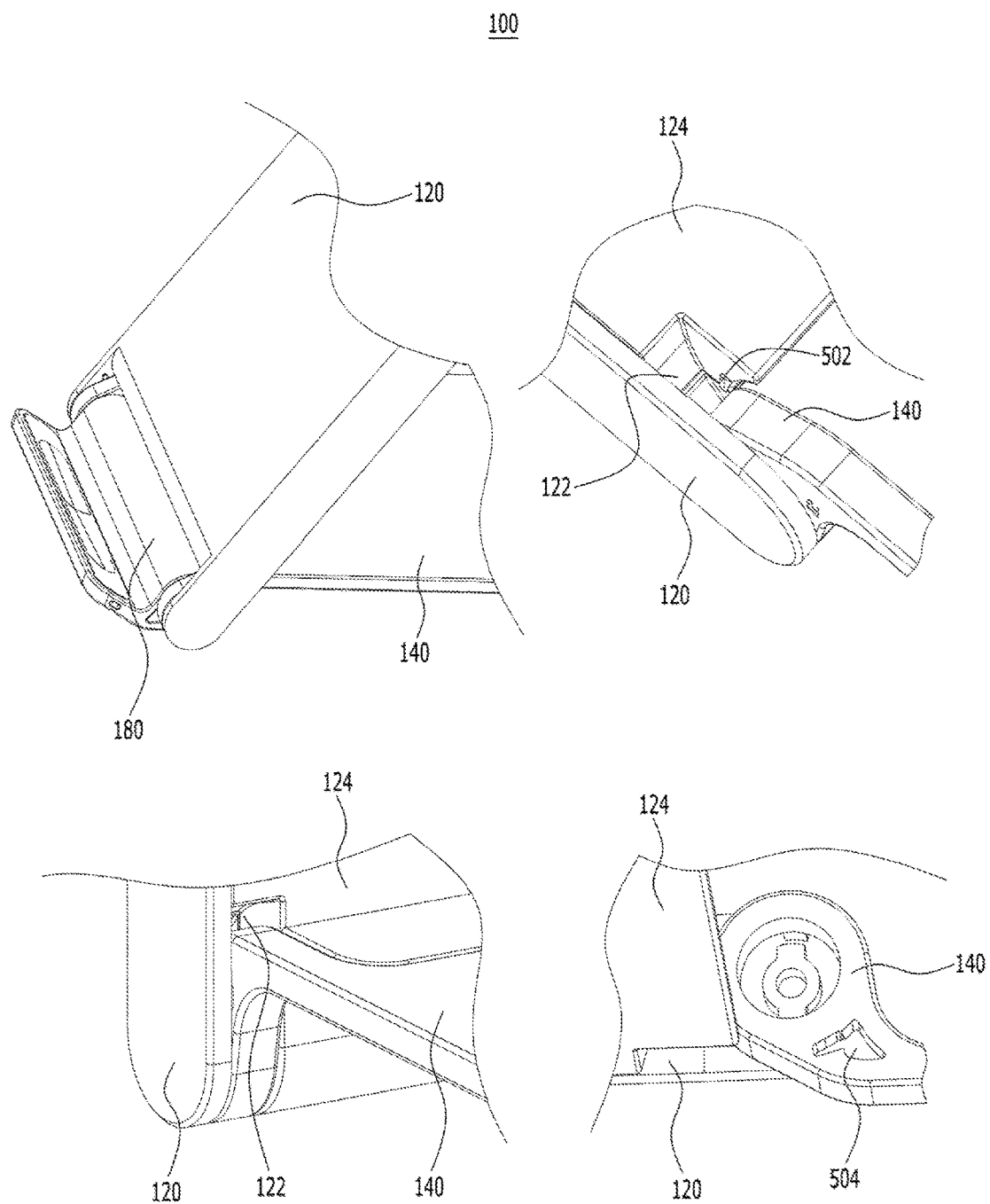
FIG. 11 describes how to stop a backlashing of the second rotating member included in the portable wireless charging device.

FIG. 11 describes how to stop a backlashing of the second rotating member 140 included in the portable wireless charging device 100.

As shown, when the second rotating member 140 of the portable wireless charging device 100 is fastened after reaching to the maximum of the second rotating angle, inner surfaces of the combination groove 122 locating on the reverse side 124 of the charging body 120 touches outer surfaces of the second rotating member 140. The second rotating member 140 can include a second backlashing stopping unit 504 configured to avoid backlashing of the second rotating member 140 when the second rotating member 140 reaches to the maximum of the second rotating angle R2. Further, in the combination groove 122, the charging body 120 can include a fastening unit 502 corresponding to the second backlashing stopping unit 504. For the way of example but not limitation, the second backlashing stopping unit 504 includes a groove while the fastening unit 502 includes a protrusion. In another embodiment, while the fastening unit 502 can include a groove not a protrusion, the second backlashing stopping unit 504 can include a protrusion not a groove. When the second backlashing stopping unit 504 and the fastening unit 502 are combined with each other, the movement of the second rotating member 140 can be fixed to avoid rotating the second rotating member 140 in a reverse direction.

Further, the fastening unit 502 can increase a frictional force before reaching to the second backlashing stopping unit 504 while the second rotating member 140 moves into the combination groove 122, in order to inform that the second rotating member 140 has moved up to the maximum of the second rotating angle R2.

Figure 12:
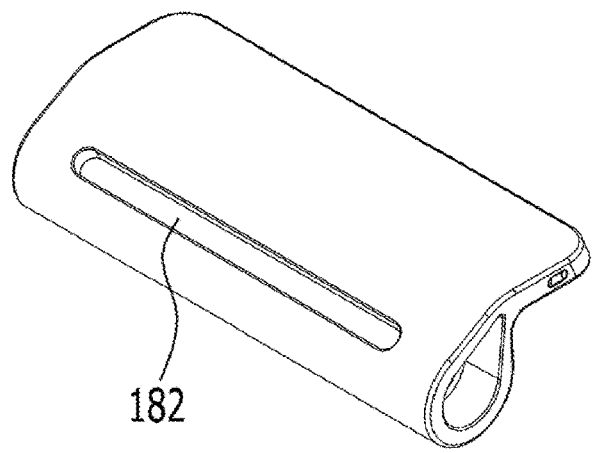
FIG. 12 describes a structure of the first rotating member included in the portable wireless charging device.
Figure 12:
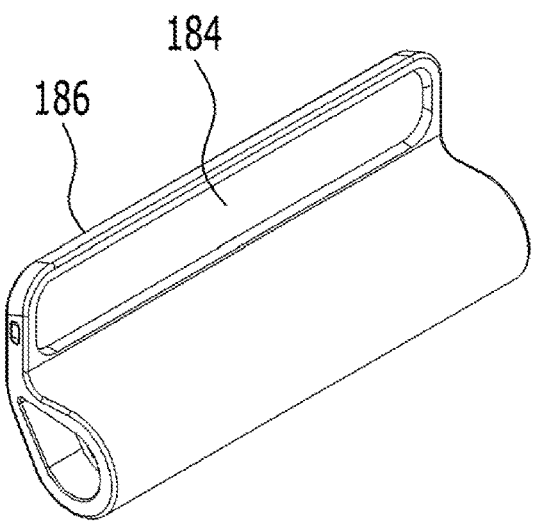

FIG. 12 describes a structure of the first rotating member 180 included in the portable wireless charging device 100.

As shown, the first rotating member 180 can include a first slip-resistant part formed in a portion touching another structure when the first rotating member 180 is rotated up to a maximum of first rotating angle, in order to avoid a slip of the portable apparatus, and a second slip-resistant part formed in the opposite side of the first slip-resistant part, in order to avoid a slip of the charging target. The first slip-resistant part can be formed by filling a first bar-shaped trench 182 with a material having a higher coefficient of friction than a predetermined value. In the opposite side of the first slip-resistant part, the second slip-resistant part can be formed by filling a second bar-shaped trench 184, which is wider than the first bar-shaped trench 182 so as to be corresponding to a width or a thickness of the charging target, with a material having a higher coefficient of friction than a predetermined value. For example, a rubber can be used as the material having a higher coefficient of friction than a predetermined value.

Further, the first rotating member 180 can include an outer surface 186 configured to engage with the second rotating member 140 shown in FIG. 8, while the second rotating member 140 include a hole 141 for engaging with the first rotating member 180. A portion of an inner surface of the hole 141 and a portion of the outer surface 186 of the first rotating member 180, which are touched with each other, can be inclined in the predetermined direction. When the second rotating member 140 moves additionally even if the first rotating member 180 is fixed after reaching to the maximum of the first rotating angle, the inclined outer surface 186 can facilitate separating the second rotating member 140 from the first rotating member 180. Further, when the second rotating member 140 moves in a reverse direction in order that the second rotating member 140 touches the charging body 120 to be folded, the inclined inner surface of the hole 141 in the second rotating member 140 can touch the inclined outer surface 186 of the first rotating member 180 so as to induce that the first rotating member 180 and the second rotating member 140 can be folded together to the charging body 120.

Figure 13A:
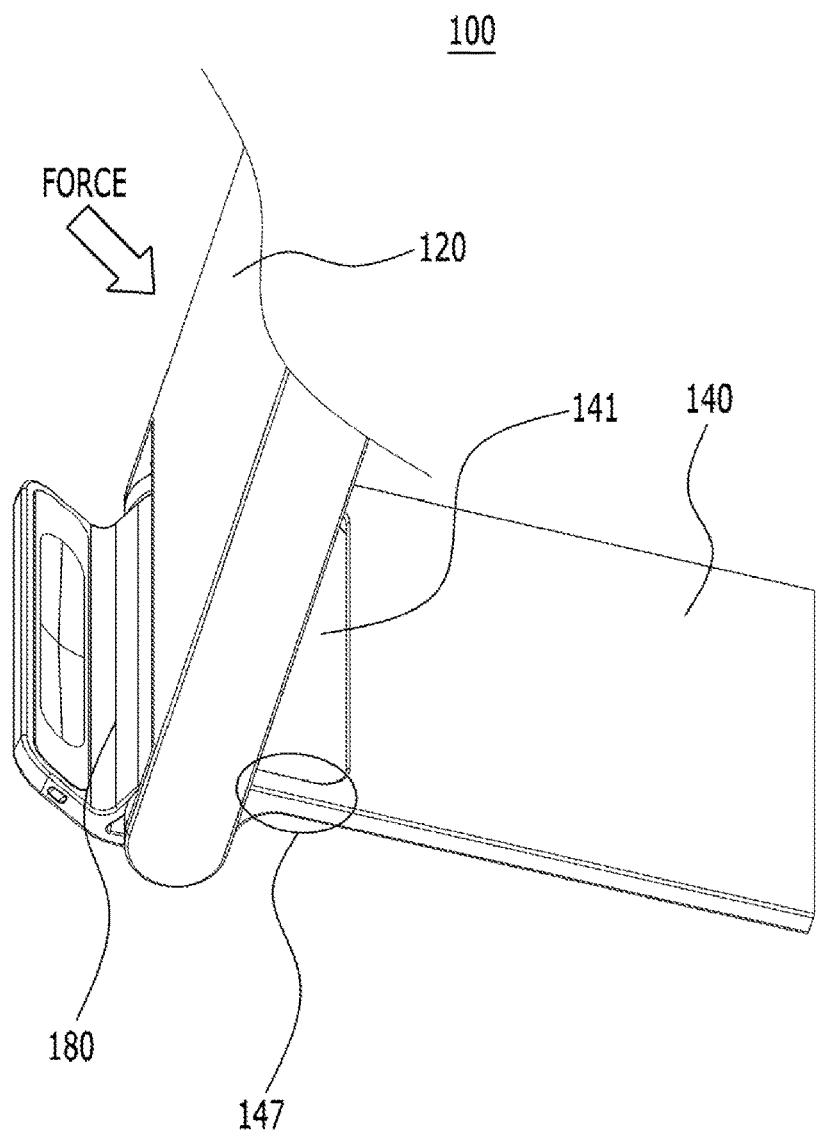
FIGS. 13A and 13B show a situation when an excessive force or impact is externally applied to the portable wireless charging device.
Figure 13B:
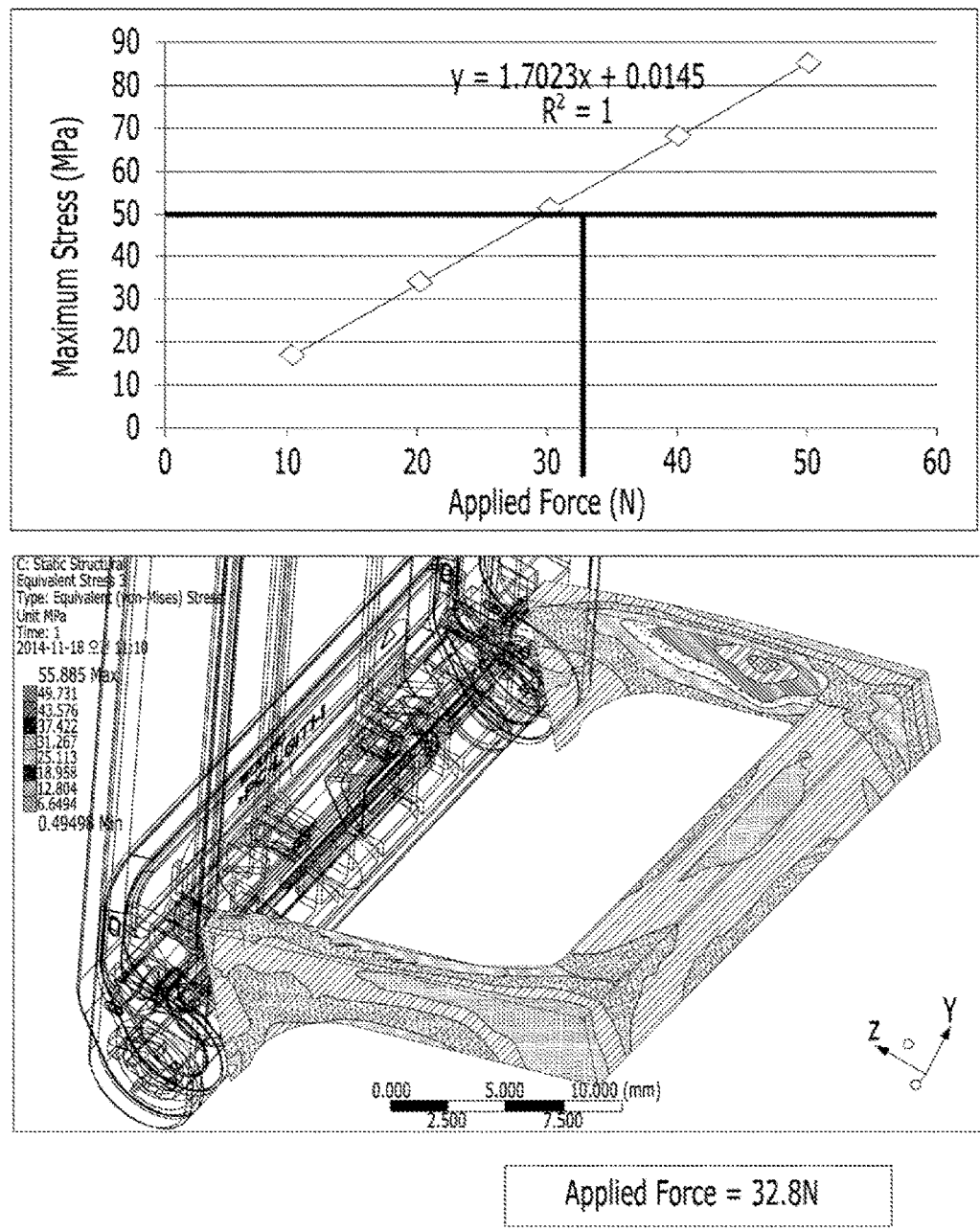

FIGS. 13A and 13B show a situation when an excessive force or impact is externally applied to the portable wireless charging device.

Referring to FIG. 13A, when an excessive force or an unexpected impact is applied externally, a strain week portion 147 included in the second rotating member 140 of the portable wireless charging device 100 can be exposed to danger. The second rotating member 140 include the hole 141 to engage with the first rotating member 180. Accordingly, the strain week portion 147 at outsides of the hole 141 is required to be formed more narrowly than other parts or portions. Thus, the strain week portion 147 can be more easily deformed by an excessive force or an unexpected impact applied externally than other parts or portions of the second rotating member 140.

Referring to FIG. 13B, a simulation result can show that a stress applied to the strain week portion 147 in the second rotating member 140 can be proportionate to a force applied to the charging body 120. For example, the strain week portion 147 could be deformed when the force is beyond 55.86 MPa. However, a threshold of force which makes the strain week portion 147 be deformed can be varied based on a material constituting the second rotating member 140.

Herein, a force applied to the charging body 120 can be occurred by a user as well as from an overweight charging target. Further, when the second rotating member 140 is enforced to revolve around the charging body 120 beyond the maximum of the second rotating angle, the strain week portion 147 in the second rotating member 140 can be deformed.

Figure 14:
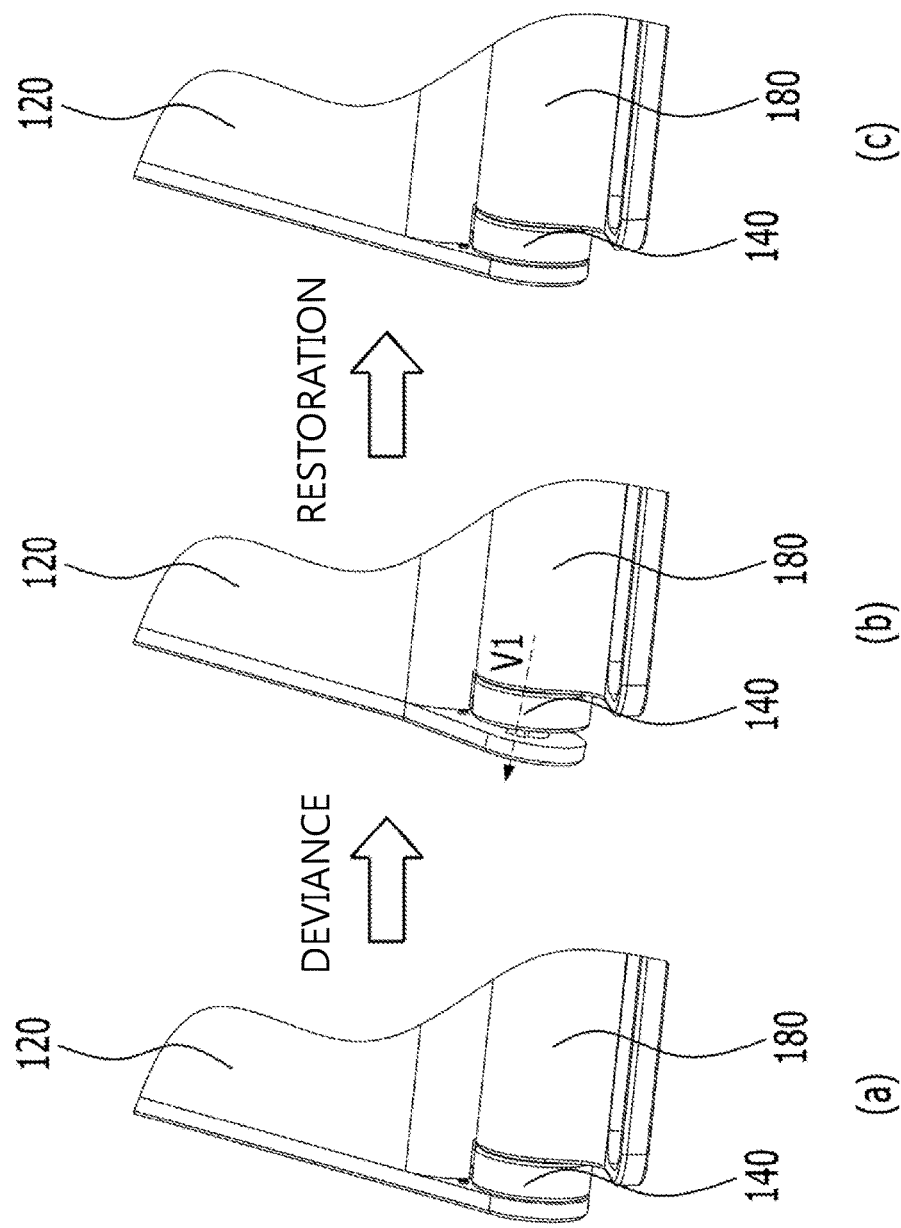
FIG. 14 describes deviance and restoration of the portable wireless charging device in response to an excessive force or an unexpected impact.

FIG. 14 describes deviance and restoration of the portable wireless charging device 100 in response to an excessive force or an unexpected impact.

Referring to (a) of FIG. 14, the first rotating member 180 and the second rotating member 140 of the portable wireless charging device 100 are fastened after rotated up to the maximums of first and second rotating angles respectively. When an excessive force is applied to the charging body 120 of the portable wireless charging device 100, some portion of the charging body 120 engaged with the second rotating member 140 can be deviated in a first direction V1, as shown in (b) of FIG. 14. Referring to (c) of FIG. 14, a user can apply a force to the some portion of the charging body 120 in the opposite direction of the first direction V1, the charging body 120 of the portable wireless charging device 100 can be restored.

Figure 15:
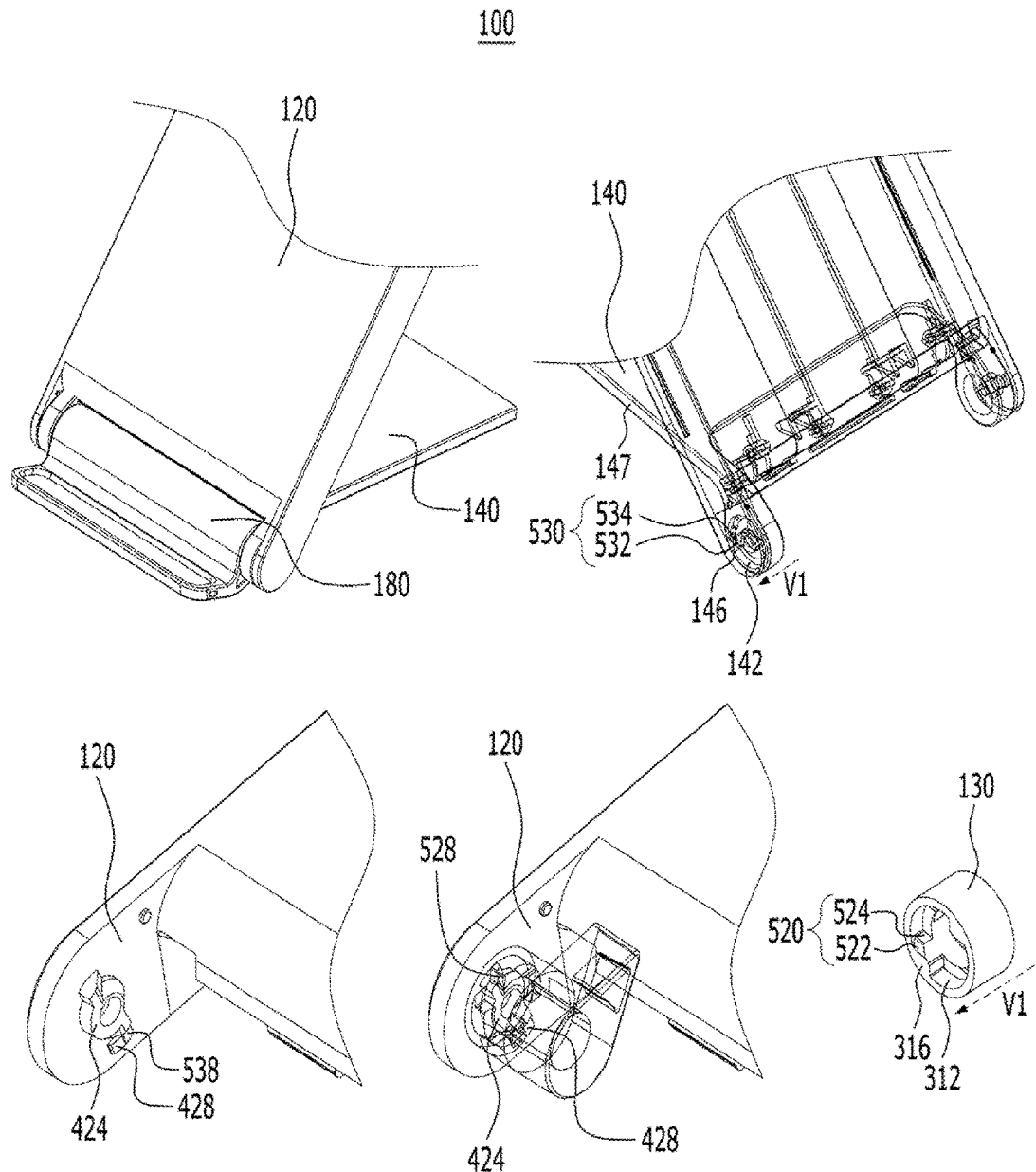
FIG. 15 shows a device for avoid a strain of the portable wireless charging device.

FIG. 15 shows a device for avoid a strain of the portable wireless charging device 100.

As shown, the first rotating member 180 and the second rotating member 140 of the portable wireless charging device 100 have moved up to the maximums of the first and second rotating angles respectively, and the movements of the first rotating member 180 and the second rotating member 140 can be stopped. If an excessive force is applied while or after the first rotating member 180 and the second rotating member 140 are fastened, the strain week portion 147 or other parts can be deformed. To avoid strain, distortion or destroy of the charging body 120, the first rotating member 180 and the second rotating member 140 included in the portable wireless charging device 100, the portable wireless charging device 100 can include the second strain avoiding part 530, a first strain avoiding part 520, a first deviance part 528 and a second deviance part 538.

The first strain avoiding part 520 is formed in the auxiliary rotor 310. By the way of example but not limitation, the first strain avoiding part 520 can include a first inclined surface 522 and a first raised spot 524 which are formed in one side of the first stopping part 316. The auxiliary rotor 310 can control a movement of the first rotating member 180 via the first path guiding part 312 and the first stopping part 316. The first revolving part 424 formed in the charging body 120 moves along the first path guiding part 312 and would be stopped by the first stopping part 316. At a place adjacent to the first stopping part 316, the first raised spot 524 is formed in an inner half of the width W1 of the first path guiding part 312, shown in FIG. 7, while the first inclined surface 522 is formed in the other half (i.e., outer half) of the width W1 of the first path guiding part 312. Herein, it can be adjusted according to embodiments how much portion of the width W1 of the first path guiding part 312 is assigned to either the first raised spot 524 or the first inclined surface 522.

The first deviance part 528 corresponding to the first strain avoiding part 520 can include inclined surfaces formed on both sides of the first revolving part 424. The inclined surfaces of the first deviance part 528 can be engaged with the first inclined surface 522 of the first strain avoiding part 520. When the first rotating member 180 reaches to the maximum of the first rotating angle R1 shown in FIG. 2C, the first revolving part 424 is stopped by the first raised spot 524 formed in the inner side. In this state, if an excessive force is applied, the first revolving part 424 can be deviated in the first direction V1 through the first inclined surface 522. The first inclined surface 522 and the first deviance part 528 can make the charging body 120 smoothly deviate from the auxiliary rotor 310 so as to avoid that some elements or parts such as the charging body 120 and the second rotating member 140 can be distorted, deformed or strained.

The second strain avoiding part 530 is formed in the second rotating member 140. By the way of example but not limitation, the second strain avoiding part 530 can include a second inclined surface 532 and a second raised spot 534 formed in one side of the second stopping part 146 of the second rotating member 140. A movement of the second rotating member 140 can be controlled by the second path guiding part 142 and the second stopping part 146. The second revolving part 428 formed in the charging body 120 moves along the second path guiding part 142 and would be stopped by the second stopping part 146 when the second rotating member 140 reaches to the maximum of the second rotating angle R2 shown in FIG. 2C. At a place adjacent to the second stopping part 146, the second raised spot 534 is formed in an inner side, while the second inclined surface 532 is formed in the other side (i.e., outer side).

The second deviance part 538 corresponding to the second strain avoiding part 530 can include inclined surfaces formed on the second revolving part 428. Herein, the inclined surfaces of the second deviance part 538 can be engaged with the second inclined surface 532 of the second strain avoiding part 530. When the second rotating member 140 reaches to the maximum of the second rotating angle R2, the second revolving part 428 is stopped by the second raised spot 534 formed in the inner side. In this state, when an excessive force is applied, the second revolving part 428 can be deviated in the first direction V1 through the second inclined surface 532. The second inclined surface 532 and the second deviance part 538 can make the charging body 120 smoothly deviate from the second rotating member 140 so as to avoid that some elements or parts such as the charging body 120 and the second rotating member 140 can be distorted, deformed or strained.

In FIGS. 2A to 15, the charging body 120 includes a wireless power signal transmitter such as antennas or coils configured to provide a power signal to the charging target siting on the charging body 120. However, if the charging body 120 does not include any wireless power signal transmitter, the portable wireless charging device 100 can be used as a cradle for portable devices.

For example, the cradle for portable devices can include a supporting body supporting an article in lieu of the charging body 120. The supporting body can have the same shape to the charging body 120, and be implemented by a thin slab because the supporting body is not required to include an additional element or component such as a transmitter. In the cradle, an allowable load can be different according to materials included in the supporting body, a first rotating member, a second rotating member, and the like. Further, based on a size of the supporting body such as a surface area, an article set or displayed on the supporting body can have a different size. In the cradle, movements of the first and second rotating members can be substantially same with those in the portable wireless charging device.

As above described, a foldable wireless charger without a protrusion can enhance user's portability.

Further, a foldable wireless charger with no detachable elements can reduce a risk or overcome a disadvantage of losing its part or element when a user separates its part or element to carry it.

A foldable wireless charger even including rotating elements can avoid strain of the rotating elements when an unexpected impact or an excessive force is given. Accordingly, since strain can be prevented when a user puts an excessive force to use the foldable wireless charger, manipulation for charging operation can be easily done and user's convenience can be improved.

When a rotating member reaches to a maximum rotating angle while a user manipulates a foldable wireless charging device, the foldable wireless charging device can make the user recognize the maximum rotating angle so that user's mistake such as forcing an excessive power to it can be avoided and user's manipulation can be easily.

In a foldable wireless charging device, each of plural rotating members moving in the same direction can be stopped at different locations so that a user can handle it conveniently.

The aforementioned embodiments are achieved by combination of structural elements and features of the invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the invention. The order of operations described in the embodiments of the invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the invention without departing from the spirit or scope of the inventions. Thus, it is intended that the invention covers the modifications and variations of this invention provided they come within the scope of the appended claims and their equivalents.

What is claimed is:

1. A portable apparatus for a wireless charging operation, comprising:
   a charging body including a transmitter configured to send a power signal for a charging operation;
   a first rotating member supporting a charging target;
   a second rotating member supporting the charging body; and
   a hinging member configured to couple each of the charging body, the first rotating member and the second rotating member to each other,
   wherein the first rotating member and the second rotating member revolve around the charging body in a predetermined direction, but move within different rotating angles by the hinging member.

2. The portable apparatus according to claim 1, further comprising a first rotating control unit configured to make the first rotating member and the second rotating member co-rotate until the first rotating member reaches to the maximum of a first rotating angle while the second rotating member touches, or moves away from, the charging body,
   wherein the first rotating control unit comprises either a first dent formed on the first rotating member and a first protrusion formed on the second rotating member, or a second protrusion formed on the first rotating member and a second dent formed on the second rotating member.

3. The portable apparatus according to claim 1, further comprising a first fastening unit configured to fasten the second rotating member with the charging body, wherein the first fastening unit comprises either a third dent formed on the second rotating member and a third protrusion formed on the charging body, or a fourth protrusion formed on the charging body and a fourth dent formed on the second rotating member.

4. The portable apparatus according to claim 1, wherein the maximum of a first rotating angle for the first rotating member ranges from 90° to 140° while the maximum of a second rotating angle for the second rotating member ranges from 270° to 330°.

5. The portable apparatus according to claim 1, wherein the hinging member comprises
an auxiliary rotor engaged with the first rotating member and the second rotating member so as to make the first rotating member and the second rotating member co-rotate in the predetermined direction.

6. The portable apparatus according to claim 5, wherein the auxiliary rotor comprises:
a connection part configured to engage the auxiliary rotor with the first rotating member;
a first path guiding part configured to guide a movement of the first rotating member;
a second path supporting part configured to guide a movement of the second rotating member; and
a first stopping part configured to determine a maximum rotating angle of the first rotating member.

7. The portable apparatus according to claim 6, wherein the first path guiding part and the second path supporting part are an inner side and an outer side of a single ring-type structure.

8. The portable apparatus according to claim 6, wherein the charging body comprises a first revolving part engaged with the inner side of the ring-type structure in order to move along the first path guiding part and to be stopped by the first stopping part.

9. The portable apparatus according to claim 6, wherein the auxiliary rotor further comprises:
a first backlashing stopping unit configured to avoid backlashing of the first rotating member, which incurs due to a reaction caused by a movement of the second rotating member when the second rotating member moves beyond the maximum of the first rotating angle and a movement of the first rotating member is stopped by the first stopping part.

10. The portable apparatus according to claim 1, wherein the second rotating member comprises:
a first hole formed to be engaged with the hinging member;
a second hole formed to determine a second rotating angle of the second rotating member; and
a second stopping part protruding from an inner surface of the second hole so as to determine a maximum of the second rotating angle.

11. The portable apparatus according to claim 10, wherein the second hole has a larger diameter than the first hole.

12. The portable apparatus according to claim 10, wherein the charging body comprises a second revolving part configured to move along a route formed between the hinging member and the second hole.

13. The portable apparatus according to claim 10, wherein the second rotating member further comprises a second backlashing stopping unit configured to avoid backlashing of the second rotating member, which incurs due to a reaction caused by a movement of the second rotating member when the second rotating member reaches to the maximum of the second rotating angle.

14. The portable apparatus according to claim 13, wherein the charging body comprises a fastening unit corresponding to the second backlashing stopping unit,
wherein the fastening unit, before reaching to the second backlashing stopping unit, touches the second rotating member to thereby increase a frictional force against a movement of the second rotating member in order to inform that the second rotating member has moved up to the maximum of the second rotating angle.

15. The portable apparatus according to claim 14, wherein the second backlashing stopping unit has a groove-type structure while the fastening unit has a protrusion-type structure.

16. The portable apparatus according to claim 10, wherein the second rotating member comprises a second revolving alert part configured to increase a frictional force against a movement guided by the second hole in order to inform that the second rotating member has moved up to the maximum of the second rotating angle.

17. The portable apparatus according to claim 1, further comprising at least one of:
a first strain avoiding part configured to deviate the charging body from the hinging member when an external force to rotate the second rotating member beyond a predetermined rotating angle is applied; and
a second strain avoiding part configured to deviate the charging body from the second rotating member when the external force is applied.

18. The portable apparatus according to claim 17, wherein the first strain avoiding part comprises a first inclined plane formed on the hinging member.

19. The portable apparatus according to claim 1, wherein the transmitter comprises at least one of antenna or coils configured to provide the power signal into the charging target.

* * * * *